FREQUENCY MODULATED V. L. F. TRANSMITTER

Filed Jan. 19, 1949 2 Sheets-Sheet 1

WITNESSES:
Robert C. Baird
Wm. C. Groome

INVENTORS
William Altar &
Patrick Conley.
BY
[signature]
ATTORNEY

FREQUENCY MODULATED V. L. F. TRANSMITTER

Filed Jan. 19, 1949 2 Sheets-Sheet 2

WITNESSES:
Robert C Baird
Wm. C. Groome

INVENTORS
William Altar &
Patrick Conley.
BY
Wymen Diamond
ATTORNEY

United States Patent Office 2,825,030

Patented Feb. 25, 1958

2,825,030

FREQUENCY MODULATED V. L. F. TRANSMITTER

William Altar and Patrick Conley, Pittsburgh, Pa., assignors to Westinghouse Electric Corporation, East Pittsburgh, Pa., a corporation of Pennsylvania Application January 19, 1949, Serial No. 71,566

23 Claims. (Cl. 332—29)

This invention relates generally to improved methods and apparatus for communication, and more particularly to methods and apparatus for decreasing distortion in frequency modulation systems of radio communication and for increasing the permissible speed of frequency shift keying in radio telegraph communication systems.

When a signal which is driving a resonant circuit is shifted in frequency the current in the resonant circuit does not follow the change in frequency with complete fidelity, and the distortion of the circuit response with respect to the impressed signal increases with increasing Q of the circuit and with decreasing signal frequency.

When the circulating currents are comparatively large, as occurs in high Q circuits, and in low radio frequency high power equipment, the actual time required for new equilibrium conditions to be established is so great as to constitute a severe distortion of the frequency modulated signals. In telegraph signals utilizing frequency shift keying, in particular, to avoid this distortion the transmission of intelligence takes place at very low keying rates. If frequency modulation generally, or frequency shift keying in particular, is attempted in a transmitter utilizing several stages of amplification, the condition is further aggravated by the additional stages. The above effect may be more readily understood by the following simple reasoning: If the frequency of a driving signal be suddenly changed, the circulating current in the driven circuit may be thought to consist of of two components, (1) the signal at the original frequency which decays exponentially from the moment of frequency change and (2) a signal at the new frequency which builds up exponentially from that same instant. If the decay or build up times are great relative to the signaling frequency excessive distortion exists.

In a low Q or high frequency circuit, the actual time required for the new frequency to acquire complete predominance will be negligible compared to the modulation rate, in frequency modulated communication, generally, or to the duration of a dot or space signal, in frequency shift keyed telegraphy. However, in a high Q or low frequency circuit the time required for new equilibrium conditions to be established may be so long as to approach the modulation frequency or the time of a dot or space signal, requiring decrease of the modulation frequency or of the keying rate in order to avoid undue distortion of the transmitted signals.

With Q values ranging in the region of 250 in high power transmitters built for operation in the 15 to 20 kilocycle region, one must expect then, transient response times, when frequencies are shifted, of the order of a few milliseconds. This results in serious signal distortion when signaling speeds of 60 words per minute in telegraphy, or 100 cycles per second in telephony, are utilized. Further, the signals ars subject to serious amplitude distortion and phase shift because the transmitter output tank circuit normally has a band width of 30 to 40 cycles from the band center to either half power point, while even quite moderate frequency swings involve frequency deviations of plus and minus 50 cycles. For high speed operation then, relatively low Q value circuits must be employed, which is incompatible with efficient operation at high power levels of the order of several hundred kilowatts.

It has been found that the difficulty explained above may be overcome if, at the same time that the driving frequency is varied, the tuning of the resonant driven circuit is modified by a corresponding amount, so that the circuit, after frequency variation of the driving signal, is tuned to the new frequency, or, in communicating by frequency modulation, if the amplifier stage or at least the tuning of the output amplifier stage of the transmitter is frequency modulated in synchronism with the signal applied thereto.

While various modes of accomplishing a change of tuning of a driven circuit in synchronism with a change in frequency of a driving signal may be employed, for example, those disclosed in an application for U. S. patent, Serial #44,633, entitled Automatic Tuning of Resonant Circuits, filed in the name of Cyril E. McClellan, Patent No. 2,653,243, and assigned to the assignee of the present application, the present invention concerns itself with a system making use of a saturable reactor having one or more radio frequency windings which are part of the tuned circuits of the transmitter and one or more bias windings connected to a modulation source. As the current in the bias winding varies, it alters the degree of saturation in an iron core common to the bias winding and the R. F. windings and so varies the self-inductance of the R. F. windings. In particular, it is possible in this manner to vary simultaneously, by corresponding amounts, the self-inductance of a frequency determining element of a modulator and the self-inductance of a resonant circuit, so that complete synchronism between signal frequency and tuning of an output resonant circuit is assured at all times.

Study of systems of the character above brifly described indicates that a workable system for reducing distortions in driven tuned circuits, caused by frequency modulation of the driving source, where the driven circuits are high Q circuits operating on relatively low frequencies, involves extremely accurate tuning and extremely accurate timing of variations of tuning of the driven circuit. The tuning control mechanism accordingly must have an extremely rapid and rigidly reproducible response. Furthermore, it must be able to handle extremely large currents with relatively high efficiency, if the system is to be applied to high power transmitters. Preferably, the control mechanism should permit rapid variation of the self-inductance of a tank circuit, and the inductance value of the tank circuit at each value of modulation signal should be independent of the magnitude of the radio frequency current in the tank circuit, in order to avoid nonlinear distortion.

Utilization of a single saturable reactor for accomplishing synchronous variations in tuning of an oscillator and amplifier is particularly advantageous, since systems of this character lend themselves readily to simultaneous variations by corresponding amounts of two inductances, one forming part of a frequency determining element of the oscillator and the other forming a tuning element of the output tank circuit of the amplifier or of an antenna circuit. Reduction to a minimum of errors in relative timing of frequency variations is assured in the two circuits by providing that the oscillator and the output tank circuit both be controlled from the same reactor.

It will be clear that the two radio frequency controlling windings of the saturable reactor must have zero intercoupling, if undesirable feed-back is to be avoided, especially in view of the wide discrepancy in power at the oscillator and power amplifier of a transmitter. It is of importance therefore to decouple the bias windings from the radio frequency windings. This may be accomplished by dividing each radio frequency coil in two sub-windings, which are wound relatively opositely on a specially constructed core. The two halves may then be connected in series or in parallel with each other, as desired, and any increase or decrease of current in the windings will have equal and opposite effect upon the inductance of the bias windings. Feed-back may then be avoided, in accordance with one embodiment of the invention, by utilizing separate reactors at the oscillator and at the power amplifier, and connecting the bias windings of the separate reactors in series with each other, so that they will carry identical bias currents. All windings may, however, in accordance with another embodiment of the invention, be placed upon a single saturable core, which has the advantage of assuring substantially identical responses in the two circuits which are being controlled.

Saturable reactors have the general disadvantage of introducing distortions in currents and voltages passing through the radio frequency winding. The principle of such devices requires that they operate on a non-linear range of the function relating bias flux and bias magnetomotive force in the core. This means that, where the core cross section is uniform throughout, operation must take place on a non-linear region of the B-H curve of the core utilized. Since the resulting flux in the core is a function of all the currents in all the windings, including the radio frequency windings, the radio frequency current itself changes the permeability of the core and, accordingly, the self-inductance of the radio frequency windings, so that changes in tuning of the control circuits will be not alone a function of the modulating signal, but also of the amplitudes of the radio frequency currents involved.

The method described hereinabove for decoupling the bias and radio frequency windings provides a remedy against non-linearity, since each radio frequency winding is arranged to occupy equal portions of separate legs of the iron core. In such an arrangement the radio frequency current in one branch opposes the biasing magneto-motive force, while the radio frequency current in the other branch aids it, so that changes in permeability due to radio frequency currents will be in opposite directions in the two legs, and will tend to cancel as regard the total self-inductance of the two windings. This purpose may be accomplished whether the two branches are connected in series or in parallel, so long as both carry equal currents and pass flux around the legs in opposite senses.

It is, accordingly, a primary object of our invention to provide a novel system for increasing keying speeds in frequency shift keyed telegraphy systems.

It is a broad object of the present invention to provide a system for conforming the frequency of response of a tuned circuit to the frequency of a driving signal therefor, when the latter is varied in frequency.

It is a further broad object of the present invention to provide a system of high speed, low frequency, frequency shift keyed telegraphy.

It is another object of the invention to provide a system for synchronously varying the tuning of a plurality of resonant circuits by means of saturable reactors.

It is a more specifice object of the present invention to provide a novel system of frequency modulation wherein the resonant frequency of a plurality of circuits is synchronously varied in response to a single signal, and wherein precise correspondence, both in timing and in tuning, is obtained between the frequencies of the circuits.

It is another object of the invention to provide a system of synchronous tuning by means of one or more saturable reactors, wherein the tuning is independent of the magnitudes of the currents flowing in the tuned circuits.

It is still another object of the invention to provide a system of synchronous tuning of a plurality of tuned circuits by means of one or more saturable reactors, wherein inter-coupling between the tuned circuits via the saturable reactors is prevented.

It is still a further object of the invention to provide a system of synchronous tuning of a plurality of resonant circuits by means of a control signal applied to a single saturable reactor.

It is another object of the invention to provide a system of synchronous tuning of a plurality of resonant circuits by means of a control signal applied to a single saturable reactor having a single bias winding wherein inter-coupling among the resonant circuits, of the resonant currents with the bias winding, is eliminated.

The above and still further objects, features, and advantages of the invention will become evident upon consideration of the following detailed description of an embodiment thereof, especially when taken in conjunction with the accompanying drawings, wherein.

Figure 1:
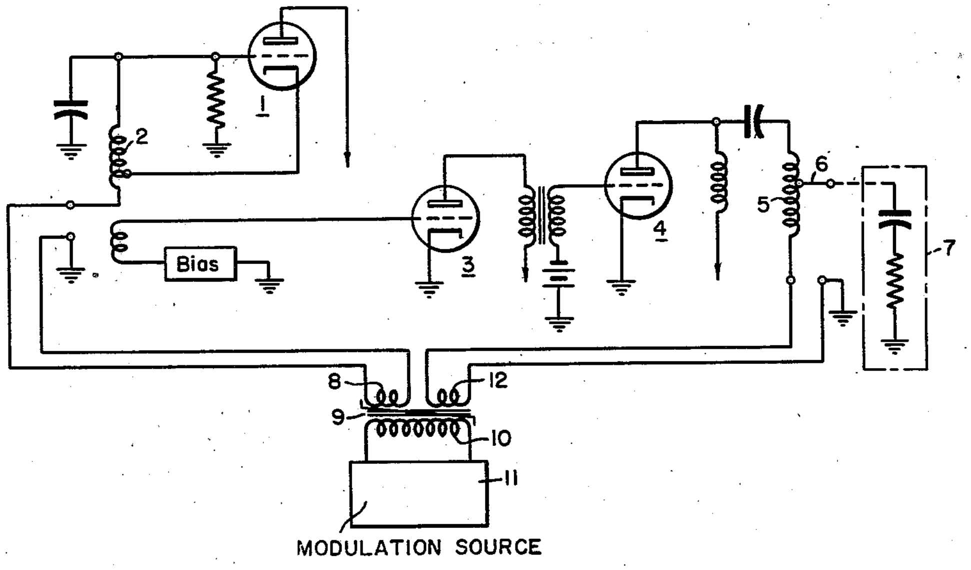
Figure 1 is a schematic circuit diagram of one specific embodiment of our invention, wherein a single saturable reactor is employed to vary the tuning of a plurality of circuits simultaneously.

Referring now more specifically to the drawings, and particularly to Figure 1 of the drawings, the reference numeral 1 identifies an oscillator, operating in the range 15 to 20 kc. for example, and comprising a tuning coil 2. The oscillator 1 is coupled via a buffer amplifier 3 with a power amplifier 4 comprising a tank coil 5, the latter being coupled via a lead 6 with an antenna load circuit, conventionally represented at 7, and representing the tank circuit capacitance.

The effective Q of the tank circuit may be relatively high, of the order of 250 in a practical embodiment of our invention. Accordingly, the tank circuit of the amplifier 4 responds, normally, only after an appreciable delay, to frequency modulations of the oscillator 1, and if the oscillator is frequency shift keyed the distorted response which ensues in the tank circuit endures for an appreciable fraction of the duration of each keyed signal, at relatively high keying speeds, necessitating slowing of the keying rate. Additionally, the amplitudes of responses in the tank circuit vary in response to frequency shifts of the oscillator 1, resulting in further distortion of signals, as explained more fully hereinbefore.

In accordance with the present invention the resonant frequency of the tank circuit is varied in precise synchronism with variations of oscillator frequency, so that the two frequencies are, during modulation, at all times precisely equal. For this purpose the tuning coil 2 of the oscillator 1 is connected in series with a radio frequency coil 8, which is wound about a core 9, the permeability of which may be varied in response to currents in a modulating or bias coil 10, which is supplied with bias signal from a modulation source 11. The source 11 may comprise either a source of keying signal, or a source of voice signal, as desired. The tank coil 5 is connected in series with a further radio frequency coil 12, wound on the core 9.

In operation, the output of the oscillator 1 serves to drive the power amplifier 4, via the isolating or buffer amplifier 3, at the same frequency as the oscillator 1.

Frequency modulation of the oscillator 1 is accomplished by varying the total inductance of the series connected coils 2 and 8, by varying the inductance of the coil 8 in response to variations in the permeability of the core 9 caused by signals provided from the modulation source 11, and applied to the core 9 via the bias coil 10. The resonant frequency of the tank circuit of the power amplifier 4 is likewise modulated by varying the inductance of the radio frequency coils 5 and 12, connected in series, that inductance being in turn determined by the inductance of the coil 12 which is controlled by the permeability of the core 9 in response to bias signal derived from the modulation source 11. Since the coils 8 and 12 are wound commonly on the core 9, it will be clear that any variation in inductance taking place in the coil 8 in response to a change of permeability of the core 9 will accomplish a similar variation in the inductance of the coil 12, so that the tuning of the tank circuit of the power amplifier 4 will be synchronized with variations in oscillator frequency due to changes in inductance of the coil 8 in response to changes of permeability of the core 9.

Figure 2:
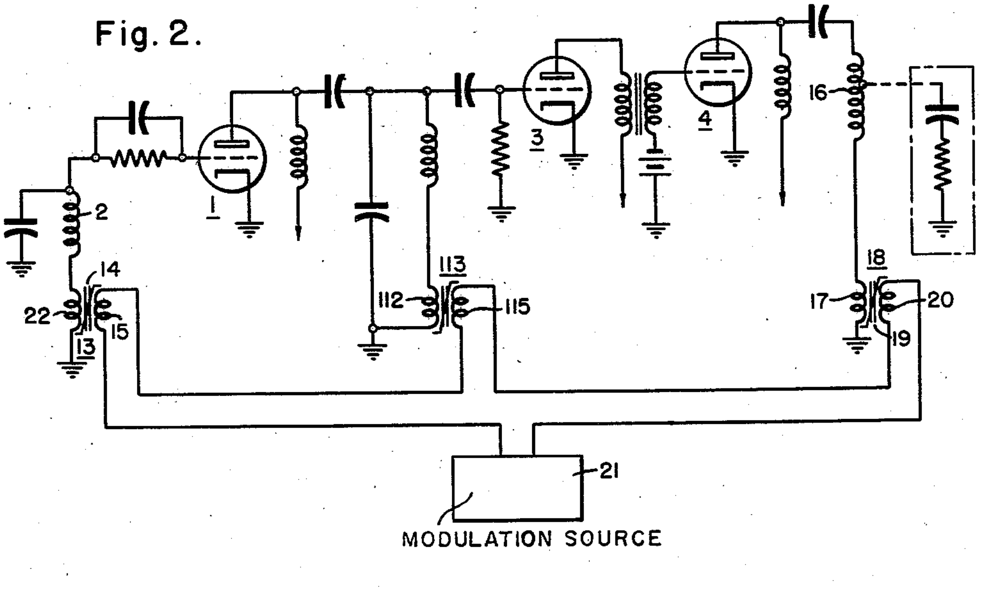
Figure 2 is a schematic circuit diagram of a modification of the system of Figure 1, wherein a separate saturable reactor is employed in each of the controlled circuits.

A modification of the system of Figure 1 is illustrated in Figure 2 of the accompanying drawings wherein three variable saturable reactors are provided, two associated with the oscillator 1 and the other with the power amplifier 4. Considering first the oscillator 1, the tuning coil 2 thereof is connected in series with the R. F. coil 22 of a saturable reactor 13 having a variable permeability core 14 and a bias winding 15. Another reactor 113 is connected in the plate circuit of the oscillator 1. This reactor includes a bias coil 115 connected in series with the coil 15, the coil 20 and the modulating source 21. The R. F. winding 112 on the reactor 113 is in the anode tank circuit of the oscillator 1. Considering the power amplifier 4, the tank coil 16 thereof is connected in series with the R. F. coil 17 of a saturable reactor 18 having a core 19 and bias winding 20. The bias windings 15 and 20 of the saturable reactors 13 and 18 respectively are connected in series with a modulation source 21, which supplies bias current thereto for varying the reluctance of the cores 14 and 19 identically, and thereby varying the tuning of the oscillator 1 and power amplifier 4 in synchonism. It will be realized that the bias windings 15 and 20 may be connected in parallel or in some combination of parallel and series arrangement instead of in series if desired. Whatever arrangement is utilized the dependence of the inductances of both R. F. windings on the bias or controlling circuit, must be the same for both windings. The series connection is preferable since thereby identity of current in the bias windings 15 and 20 is assured.

The system of Figure 2 of the accompanying drawings possesses an advantage over the system illustrated in Figure 1, in that feed-back from the winding 17 to the winding 22 is minimized, by virtue of the fact that the radio frequency windings are on separate cores. However, in the system of Figure 2, identical responses of the oscillator 1 and of the power amplifier 4 require that the magnetic parameters of the saturable reactors 13 and 18 be identical over each modulation cycle, or at all times in the operation of the system. The system of Figure 1, on the other hand, involving as it does a single common saturable reactor for controlling the oscillator 1 and the power amplifier 4, more readily assures identical responses therein, but at the expense of special construction of the saturable reactor to eliminate feed-back between the windings 12 and 8, or other interaction therebetween.

Figure 3:
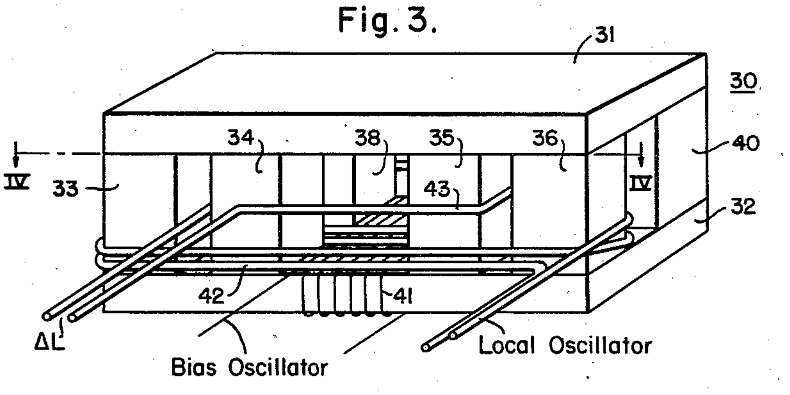
Figure 3 is a conventionalized representation of a saturable reactor utilizable in the system of Figure 1.

A saturable reactor system which may be utilized in the frequency modulation system of Figure 1, wherein the R. F. coils 8 and 12 are mutually decoupled, is illustrated in Figures 3–6, inclusive, of the drawings. Referring now to Figure 3 of the drawings, there is illustrated a saturable reactor, generally identified by the reference numeral 30, and comprising a pair of parallel plates 31 and 32, fabricated of magnetic material, and joined by a series of eight columns, 33–40, inclusive, each extending perpendicularly between the plates 31 and 32, and which may be symmetrically located, four at the corners of the plates 31 and 32, and the remaining four in groups of two located on opposite sides respectively of the structure. There is provided, accordingly, two groups of four columns each, each group of columns extending in alignment along one edge of the structure.

Figure 5:
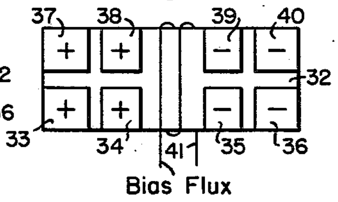
Figure 5 is a view similar to Figure 4, but illustrating the flux distribution due to the bias winding of the saturable reactor of Figure 3.

A bias winding 41 encircles the plate 32 at a position intermediate the columns 34 and 35 and establishes magnetic flux in the columns 33 to 40, inclusive, and in the plates 31 and 32. The magnetic flux generated in the core by the coil 41 is illustrated in Figure 5 of the drawings, which represents a section in plan taken along the line IV—IV of Figure 3. It will be evident, from consideration of the position of the winding 41 in Figure 5, that magnetic flux responsive to winding 41 will have respectively opposite direction in two distinct groups, comprising the columns 33, 34, 37, 38, in one group, and 35, 36, 39, 40 in another group, the flux at any instant passing in a positive direction in one of the groups and in a negative direction in the other group, in response to current flow in the winding 41.

Figure 6:
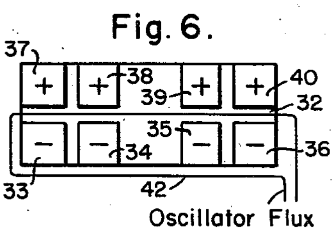
Figure 6 is a further view similar to Figure 4, but illustrating the flux distribution due to a further radio frequency winding.

One R. F. coil 42 (Figure 6) inter-links the columns 33, 34, 35 and 36 and, accordingly, provides R. F. flux of identical polarity in all these columns and flux of the opposite polarity in the columns 37, 38, 39 and 40, as illustrated in Figure 6 of the accompanying drawings. Comparing the direction of the fluxes flowing in response to currents in the coils 41 and 42, as exemplified in Figures 5 and 6 of the drawings, it will be seen that the coil 42 establishes equal and opposite fluxes in the columns 35, 36 and 39, 40, respectively, and in the columns 33, 34 and 37, 38, respectively. Otherwise stated, the coil 42 drives flux to link the coil 41 in mutually opposing directions, so that the fluxes produced by the coil 42, insofar as the coil 41 is concerned, totals zero and zero coupling accordingly exists between the coils 41 and 42, due to current in coil 42.

A further R. F. coil 43 is provided which links the columns 34, 35, 38, 39 and accordingly provides flux in a first direction in these columns, and in the opposite direction in the remaining columns 33, 36, 37 and 40, as indicated by the plus and minus signs in Figure 4 of the drawings. Considering again the relationship between the coil 41 and the coil 43, it will be evident that the coil 43 provides fluxes which have zero linkage with the coil 41, since equal positively and negatively directed flux is generated on each side of the coil 41 by the coil 43.

Figure 4:
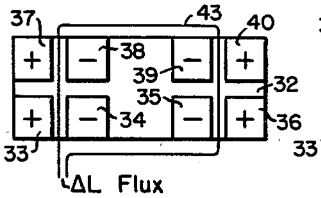
Figure 4 is a section taken on the line IV—IV of Figure 3 to show flux distribution due to one of the radio frequency windings of the saturable reactor.

At the same time the arrangement illustrated provides for decoupling between the two R. F. coils 42 and 43 since the flux produced by the coil 42, as illustrated in Figure 6 of the drawing is equally and oppositely directed in each of the pairs of columns 34, 38 and 35, 39, which link with the coil 43 of Figure 4 of the drawings, while the flux produced by the coil 43, as illustrated in Figure 4 of the drawings, produces in the four columns linked by the coil 42, two pairs of equally and oppositely directed fluxes, one pair negative in columns 34 and 35, and the other pair positive in columns 33 and 36.

The fluxes generated by the bias coil 41, and illustrated in respect to polarities in Figure 5 of the drawings, are likewise equally positive and negative, insofar as these fluxes link with either coil 42 or coil 43.

Accordingly, with the arrangement in Figure 3 of the drawings, there is simultaneously accomplished decoupling between the R. F. coils and between each of the R. F. coils and the bias coil.

It will be realized that the construction illustrated in Figure 3 of the drawings is schematic and conventionalized and does not represent the type of construction which would be utilized in a practical device.

In an actual practical construction, the air gaps illustrated in the structure of Figure 3 of the drawings would be eliminated and the R. F. core constructed of powdered iron, in order to provide low reluctance flux paths in the various required directions while eliminating leakage flux.

In systems of the character illustrated in Figure 2 of the drawings it is extremely desirable to decouple the R. F. coils from the bias coils as well as to prevent changes of core permeability due to changes of amplitude of radio frequency currents. Referring now to the system illustrated in Figure 7 of the drawings there is illustrated a core 50 in the shape of a C, which contains intermediate the open legs thereof a further closed radio frequency core 51, of generally rectangular outline, and comprising a pair of legs 52, 53, which complete the magnetic circuit for the core 50, in parallel. The bias winding 54 is wound on the core 50, and the R. F. windings 55 and 56 are wound on the legs 52 and 53, in opposite directions, respectively, and are connected in series with the radio frequency terminals 57. The structure of Figure 8 is similar to that of Figure 7 except that the windings 55' and 56', which correspond generally with the windings 55 and 56 of the embodiment of Figure 7 of the drawings, are connected in parallel across the radio frequency terminals 57, instead of in series thereacross. By virtue of the arrangement shown in Figures 7 and 8 of the drawings, the current in one branch of the R. F. windings 55, 56 (or 55', 56') opposes the bias magneto-motive force, while the current in the other branch aids the latter, so that changes in permeability of the core 50 due to radio frequency currents in the coils 55, 56 (or 55', 56'), will take place in opposite senses in the two legs 52, 53 and at least for small radio frequency currents will tend to cancel any variations in the total self-inductance of the two radio frequency windings, or in the average permeability of the entire core 50. The radio frequency windings 55, 56 (55', 56') produce, however, fluxes in the same direction around the core 51.

Figure 7:
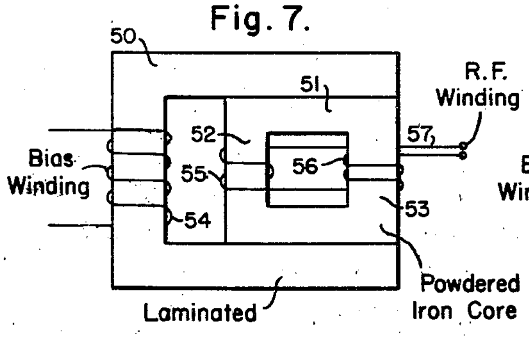
Figures 7 and 8 are schematic circuit diagrams illustrating alternative wiring arrangements and a core construction for the saturable reactors utilized in the system of Figure 2 of the drawings.
Figure 8:
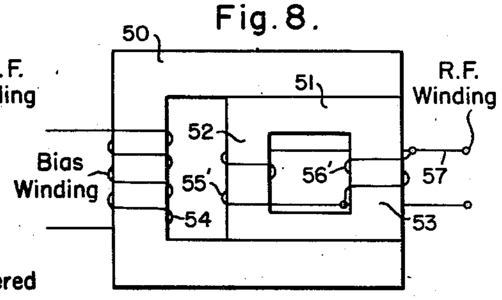

By virtue of the fact that the bias core 50 is utilized for the sole purpose of varying the reluctance of the radio frequency core 51 in the systems of Fig. 7 and Fig. 8, the bias core 50 may be constructed of laminations of relatively conventional character, rather than the extremely thin laminations, powdered iron, low loss iron, or the like, which would normally be utilized were the bias core 50 required to carry radio frequency magnetic flux. The radio frequency core 51, on the other hand, must, of course, be constructed for high frequency operation and, accordingly, must be constructed of thin laminations, powdered iron, low loss iron, or the like.

Applicants have completed a detailed mathematical and experimental investigation concerning the power requirement for systems of frequency modulation involving saturable reactors, and have demonstrated that when utilizing laminated cores for radio frequency fluxes, of a thickness of laminations within about one-third to one-half of the skin depth of the magnetic material, it is possible to accomplish frequency swings of the order of 1% of the mean frequency of the transmitter without losing excessive amounts of radio frequency power in the laminations only at high operating levels of transmitter power.

While we have described and illustrated various specific embodiments of our invention, in accordance with the requirements set out in the statutes of the United States relating to Letters Patent, it will be evident that various modifications and re-arrangements of the combinations specifically described and illustrated, and of various details thereof, may be resorted to without departing from the true spirit and scope of the invention.

We claim as our invention:

1. In combination a source of radio frequency oscillations having a predetermined normal frequency of oscillation, a low loss resonant load circuit normally tuned to resonance at said normal frequency, means comprising a saturable reactor for recurrently displacing the frequency of oscillation of said source of radio frequency oscillations from said predetermined normal frequency at a recurrence rate adapted to induce substantial transient responses in said low loss resonant load circuit, and means for substantially reducing the duration of said transient responses comprising a saturable reactor for tuning said load circuit to maintain substantial frequency synchronization between the frequency of said source of radio frequency oscillations and the resonant frequency of said low loss resonant load circuit.

2. In combination a source of radio frequency oscillations having a predetermined normal frequency of oscillation, a low loss resonant load circuit normally tuned to resonance at said normal frequency, a source of variable bias signal, means comprising a saturable reactor responsive to said bias signal for recurrently shifting the frequency of said oscillations of said source of radio frequency oscillations from said predetermined normal frequency to an adjacent frequency at a recurrence rate adapted to induce substantial transient responses in said low loss resonant load circuit, and means for substantially eliminating said transient responses comprising saturable reactor tuning means responsive to said bias signal for maintaining substantial frequency synchronization between the frequency of said source of radio frequency oscillations and the resonant frequency of said low loss resonant load circuit.

3. In combination a source of radio frequency oscillations having a predetermined normal frequency of oscillation, a low loss resonant load circuit normally tuned to resonance at said normal frequency, a source of signals, a saturable reactor responsive to said signals for modulating the frequency of oscillation of said source of radio frequency oscillations, said low loss resonant circuit having a logarithmic decrement sufficiently low to prevent response of said low loss resonant circuit in correspondence with frequency modulations of said radio frequency oscillations, whereby is introduced discrepancies between responses of said low loss resonant low circuit and said frequency modulated radio frequency oscillations, and means for substantially eliminating said discrepancies comprising saturable reactor tuning means connected in said low loss circuit and responsive to said signals for maintaining substantial frequency synchronization between the instantaneous frequency of said source of radio frequency oscillations and the resonant frequency of said low loss resonant load circuit.

4. In combination a source of radio frequency oscillations having a predetermined normal frequency of oscillation, a low loss resonant load circuit normally tuned to resonance at said normal frequency, means comprising a saturable reactor for frequency shifting the frequency of oscillation of said source of radio frequency oscillations from said predetermined normal frequency in accordance with a time pattern adapted to convey intelligence, and at a recurrence rate adapted to induce substantial transient responses in said low loss resonant circuit, and means for substantially reducing the magnitude of said transient responses comprising a saturable reactor coupled with said load circuit and controlled for maintaining frequency synchronization between the frequency of said source of radio frequency oscillation and the resonant frequency of said low loss resonant load circuit.

5. In combination a source of radio frequency oscillations having a predetermined normal frequency of oscillation, a low loss resonant load circuit normally tuned to resonance at said normal frequency, means comprising a signal source and a saturable reactor responsive to said signal source for recurrently displacing the frequency of oscillation of said source of radio frequency oscillation from said predetermined normal frequency at a recurrence rate adapted to induce substantial transient responses in said low loss resonant load circuit, said transient responses having durations which are substantial in comparison with said recurrence rate, and means for substantially reducing the durations of said transient responses comprising a saturable reactor responsive to said signal source and coupled with said load circuit for varying the resonant frequency of said load circuit to maintain substantial frequency synchronization between the frequency of said source of radio frequency oscillation and the resonant frequency of said low loss resonant load circuit.

6. In a frequency-shift keyed telegraphy transmitter, in combination, a source of radio frequency signal operating at a first predetermined frequency, means comprising a saturable reactor for shifting the frequency of said signal intermittently by a predetermined increment of frequency, a resonant circuit coupled with said source of radio frequency signal in driven relation thereto and tuned to said predetermined frequency, said resonant circuit having a low value of logarithmic decrement, and means comprising said saturable reactor for shifting the resonant frequency of said resonant circuit in synchronism with the frequency of said signal to maintain continuous frequency correspondence between the frequency of said signal and the resonant frequency of said circuit.

7. Apparatus according to claim 6 including a plurality of resonant networks and a plurality of saturable reactors, one connected in certain of said resonant networks.

8. In combination, a source of radio frequency oscillations having a predetermined normal frequency of oscillations, said source of radio frequency oscillations comprising an electronic oscillator having a frequency determining circuit comprising an inductance, said inductance comprising a magnetic core of variable permeability, means for modulating the frequency of said oscillations comprising a source of signals and means responsive to said signals for varying said permeability, a low loss resonant load circuit normally tuned to resonance at said normal frequency, said load circuit comprising a tuning inductance, said tuning inductance comprising a magnetic core of variable permeability, and means responsive to said signals for varying the permeability of said tuning inductance.

9. The combination in accordance with claim 8 wherein each of said inductances comprises a core having a pair of arms passing magnetic flux in parallel, said inductances comprising a pair of coils each linking one of said arms and wound to provide oppositely directed magneto-motive forces, respectively, said means for varying permeability comprising a bias coil for varying equally and in the same sense the permeability of said arms.

10. In combination, a source of radio frequency oscillations having a predetermined normal frequency of oscillations, said source of radio frequency oscillations comprising an electronic oscillator having a frequency determining circuit comprising an inductance, said inductance comprising a magnetic core of variable permeability, means for modulating the frequency of said oscillations comprising a source of signals and means responsive to said signals for varying said permeability, an amplifier driven by said radio frequency oscillations and comprising a low loss resonant load circuit normally tuned to said normal frequency of oscillations, said load circuit comprising a tuning inductance comprising said magnetic core of variable permeability.

11. The combination in accordance with claim 8, wherein said first mentioned inductance and said tuning inductance are mutually decoupled.

12. The combination in accordance with claim 8 wherein said means for modulating comprises a bias coil linked with said core, and wherein said first mentioned inductance, said tuning inductance and said bias coil are mutually decoupled.

13. In combination, a source of radio frequency oscillations having a predetermined normal frequency of oscillations, said source comprising an electronic oscillator having a frequency determining circuit comprising an inductance, said inductance comprising a magnetic core of variable permeability, means comprising a bias coil linked with said core for varying the permeability thereof, a power amplifier driven from said source and comprising a low loss resonant load circuit normally tuned to resonance at said normal frequency, said load circuit comprising a tuning inductance, said tuning inductance comprising a magnetic core of variable permeability, a bias coil linked with said last named core for varying the permeability thereof, and means for applying identical electrical currents to said bias coils.

14. The combination in accordance with claim 13, wherein said tuning inductance comprises a pair of coils connected to carry equal currents, and mutually oriented to provide opposite magneto-motive forces in said last named core.

15. The combination in accordance with claim 13 wherein said each of said inductances is decoupled from its associated bias coil.

16. In combination, a pair of oscillating circuits each comprising a tuning coil, a saturable reactor comprising magnetic material linking with each of said coils, a bias winding linking said magnetic material, said bias winding being oriented with respect to said magnetic material to generate equal magnetic fluxes in opposite directions on opposite sides of a plane bisecting said magnetic material, and each of said tuning coils linking equally the flux on both sides of said plane, said tuning coils being mutually decoupled.

17. In combination, a pair of oscillating circuits each comprising a tuning coil, a saturable reactor comprising magnetic material linking with each of said coils, a bias winding linking said magnetic material, said bias winding being arranged to generate equal magnetic fluxes in opposite directions on opposite sides of a plane bisecting said magnetic material, each of said tuning coils linking equally with 50% of the flux on both sides of said plane, said tuning coils being arranged to generate equal magnetic fluxes in opposite directions in said magnetic material, each of said tuning coils having zero linkage with magnetic fluxes generated by the other of said tuning coils.

18. A frequency modulation system comprising a resonant circuit having a tuning coil, a saturable magnetic core linked with said tuning coil, said saturable magnetic core comprising a closed magnetic loop and said tuning coil comprising a pair of windings arranged to generate equal and opposite magneto-motive forces in said loop, and means comprising a further magnetic core having an energizing winding for generating magneto-motive force in said further magnetic core, said last named magneto-motive force aiding one of said equal and opposite magneto-motive forces and opposing the other of said equal and opposite magneto-motive forces, whereby the total magnetic flux in said magnetic lop is independent of current flow in said tuning coil and said tuning coil is decoupled from said energizing winding.

19. A saturable core tuner comprisng in combination: a tunable circuit having an inductor and a saturable core therefor; a saturating flux source; a member of high permeability material completing a magnetic path of extended length between said saturable core and said flux source, and a high permeability decoupling element completing a shortened low reluctance path through said saturable core, whereby decoupling of the tunable circuits is effected.

20. A tuner as described in claim 19 in which said decoupling element is physically interspersed between said saturable core and said high permeability core.

21. A tuning control instrumentality comprising a saturable core element for a tunable winding, a saturating control core for a saturation winding, high permeability frame members completing a magnetic path between said element and said control core, and a high permeability decoupling element completing a closed magnetic circuit through said frame members and said core element exclusive of any path through said control core, thereby effectively magnetically isolating each saturation core from said control core.

22. An instrumentality as defined in claim 21 wherein said decoupling element is physically interspersed between said saturable core element and said control core.

23. An instrumentality as defined in claim 21 wherein the magnetic path through said saturable core element and said control core is of higher reluctance than the magnetic path through said saturable core element and said decoupling element.

References Cited in the file of this patent

UNITED STATES PATENTS

| | | |
|---|---|---|
| 2,382,615 | Donley | Aug. 14, 1945 |
| 2,480,820 | Hollingsworth | Aug. 30, 1949 |